United States Patent [19]
Fisk

[11] Patent Number: 5,755,358
[45] Date of Patent: May 26, 1998

[54] TONER LEVEL DETECTION SYSTEM

[75] Inventor: Duane H. Fisk, Whitesville, N.Y.

[73] Assignee: Xerox Corporation, Stamford, Conn.

[21] Appl. No.: 673,532

[22] Filed: Jul. 1, 1996

[51] Int. Cl.⁶ .................................................. B67D 5/06
[52] U.S. Cl. ........................ 222/23; 222/64; 222/DIG. 1
[58] Field of Search ............................. 222/23, 64, 66, 222/DIG. 1

[56] References Cited

U.S. PATENT DOCUMENTS

| | | | |
|---|---|---|---|
| 2,696,606 | 12/1954 | de la Pomélie | 222/64 |
| 3,920,155 | 11/1975 | Whited | 222/23 |
| 3,979,012 | 9/1976 | Arfert et al. | 220/231 |
| 4,135,642 | 1/1979 | Forward et al. | 222/23 |
| 4,159,786 | 7/1979 | Biddle, III et al. | 222/64 |
| 4,289,026 | 9/1981 | Neumann | 222/DIG. 1 |
| 4,579,253 | 4/1986 | Shenier | 222/DIG. 1 |
| 5,216,462 | 6/1993 | Nakajima et al. | 222/DIG. 1 |
| 5,435,461 | 7/1995 | Smith et al. | 222/DIG. 1 |

OTHER PUBLICATIONS

Xerox Disclosure Journal, "Toner Level Sensor", vol. 5, No. 1, Jan./Feb. 1980 p. 85.

Primary Examiner—Joseph Kaufman
Attorney, Agent, or Firm—Lloyd F. Bean, II

[57] ABSTRACT

A system for dispensing toner particles from a toner hopper to a development system, a sensing system for detecting low toner condition within the toner hopper, the sensing system including a flexible wall assembly mounted within the hopper and in fluid communication with the toner particles within the toner hopper, the flexible wall assembly being adapted to transmit an interior pressure generated by the toner within the toner hopper being indicative of an amount of toner present therein; and a sensor assembly mounted exterior to the toner hopper and in communication with the flexible wall assembly, for sensing the interior pressure. There is provided circuitry responsive to the sensor for generating a feed back signal indicative of a low toner condition within the toner hopper.

3 Claims, 3 Drawing Sheets

TONER LEVEL DETECTION SYSTEM

BACKGROUND OF THE INVENTION

This invention relates to toner dispensers for electrophotographic copiers and duplicators and, more particularly to a low toner detection and indicating system for warning a machine operator of impending exhaustion of the toner supply.

In the process of electrostatographic printing, an electrostatic charge pattern or latent image corresponding to an original document to be reproduced is recorded on an insulating medium. A viewable record is produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles (simply "toner" hereafter) must be supplied. In this way, the concentration of toner in the developer mix is maintained substantially constant.

In the operation of an electrophotographic copier or printer, it is highly desirable to have means for indicating when the supply of toner in the dispensing apparatus has become exhausted. When the supply of toner finally nears exhaustion, there may be a perceptible reduction in the density of the developed image and, therefore, a corresponding degradation in copy quality, e.g., unacceptable light copy. This latter condition is usually the first indication to an operator that the toner supply is in need of replenishment. Upon installation of a new toner supply in the form of a toner cartridge, and upon continued resumption of copying, the output copies will still be light because of the continued low toner concentration. To recover from this detoned condition, under normal dispensing, may take several days. For copiers which reproduce large documents such as the Xerox 4850, the machine, without corrective action, will never fully recover. The remedy, at this point, is to add fresh toner to the developer mix to increase the toner concentration to the required level before resuming operation. Typically, this is achieved by manually rotating an installed dispenser cartridge until the desired concentration level is reached.

It is, therefore, apparent that an early warning of impending toner exhaustion would be desirable so that toner could be replenished before being totally exhausted. Toner replacement could then be implemented at a time while the toner concentration is still at acceptable levels. There have been several approaches in the prior art to provide this low toner level sensing indication. U.S. Pat. No. 4,135,642, assigned to the same assignee as the present invention, illustrates a technique whereby an opposed lamp and photocell are located at the bottom of a toner dispensing housing. When the toner level drops to a sufficiently low point, an electrical signal is produced at the photocell which can be used to generate a visual or audible indication of low toner. A publication entitled "Toner Level Sensor", published in the Xerox Disclosure Journal, Vol. 5, No. 1, Jan./Feb. 1980, discloses a float type sensor which rides on the toner bed within the cartridge and provides an indication, on a calibrated display, of low toner level.

Other toner art methods utilized a mechanism which is internal to the toner dispenser housing and which interacts in some manner with the toner supply. The mechanism is coupled electrically or magnetically to an electrical circuit located adjacent to, but outside of the housing. U.S. Pat. No. 3,920,155, assigned to the same assignee as the present invention discloses a sensing means 114. The housing is oscillated to dispense toner through output ports; the sensing mean extends into the toner bed and is oscillated at the same rate as the housing. When the toner level drops below a specified point, the sensing mechanism becomes free of contact with the toner and begins oscillating at a rate different than that of the housing. A detecting means exterior to the housing, is located so as to detect the different oscillation rates of the housing and the sensing mechanism and generates a signal indicating a low toner level. U.S. Pat. No. 3,979,012, also assigned to the same assignee as the present invention, discloses another low level sensing system which uses a longitudinally installed shaft member with magnetic paddles protruding through the ends. The paddles extend into the toner bed and rotate therewith until the toner drops below a certain point. At that time, the paddles come under the influence of magnets located in the interior sides of the housing and rotate to a position where a switch is closed producing a low toner signal.

It has been found that in sensing system where the sensor is placed within the developer material, reliability and life expectancy of the sensor is at risk.

BRIEF SUMMARY OF THE INVENTION

The present invention is directed to a low toner level sensing and indicator system which is relatively simple to install and to operate. There is provided a system for dispensing toner particles from a toner hopper to a development system, a sensing system for detecting low toner condition within said toner hopper, said sensing system including a flexible wall assembly mounted within said hopper and in fluid communication with said toner particles within the toner hopper, said flexible wall assembly being adapted transmit an interior pressure generated by the toner within said toner hopper; and a sensor assembly mounted exterior to the toner hopper and in communication with said flexible wall assembly, for sensing said interior pressure.

Other features of the present invention will become apparent as the following description proceeds and upon reference to the drawings.

DETAILED DESCRIPTION OF THE PREFERRED EMBODIMENT OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 4 printing machine will be shown hereinafter schematically and their operation described briefly with reference thereto.

Figure 4:
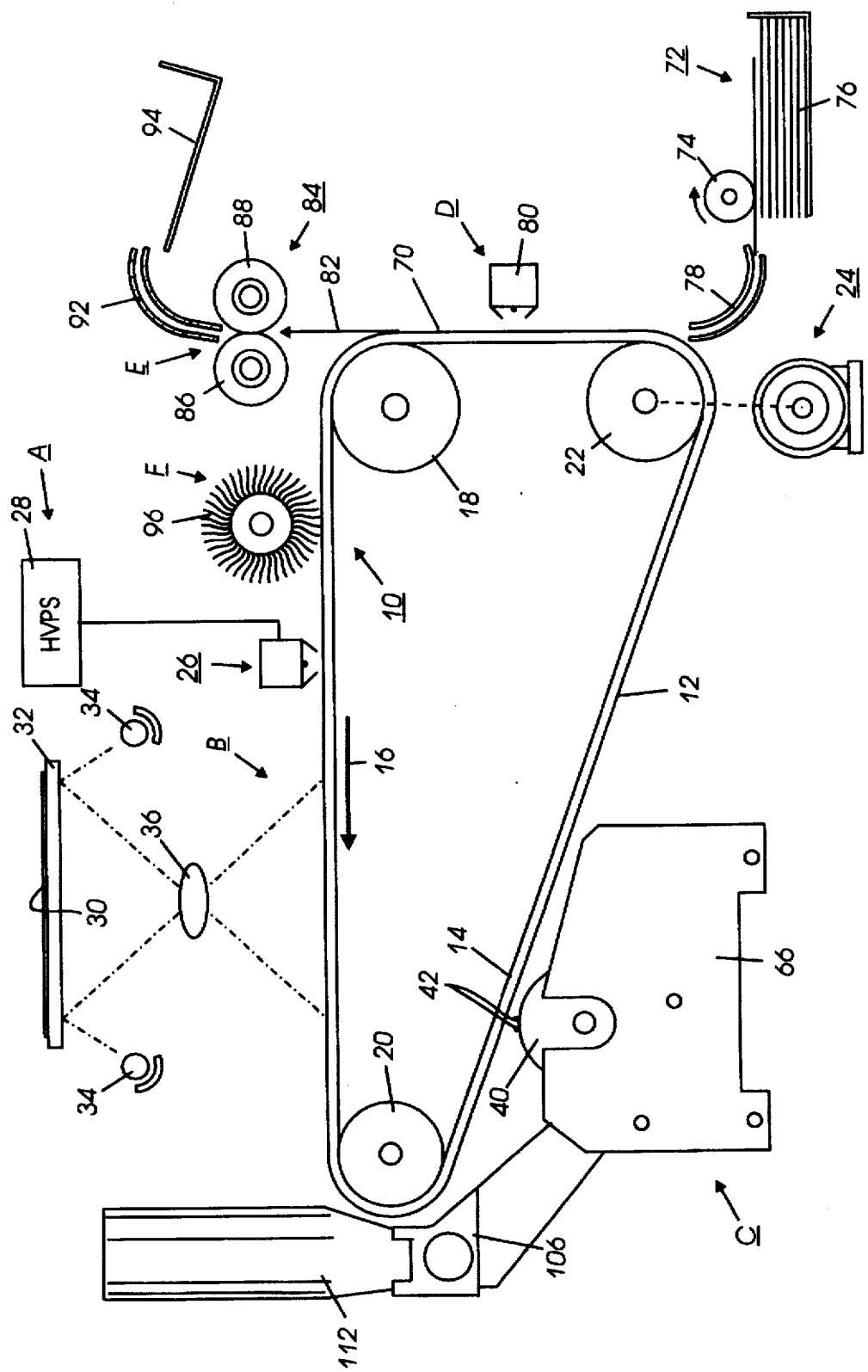
FIG. 4 is a schematic elevational view of an illustrative electrophotographic printing machine incorporating a developer unit having the features of the present invention therein.

Referring initially to FIG. 4, there is shown an illustrative electrophotographic printing machine incorporating the development apparatus of the present invention therein. The electrophotographic printing machine employs a belt 10 having a photoconductive surface 12 deposited on a conductive substrate 14. Preferably, photoconductive surface 12 is made from selenium alloy. Conductive substrate 14 is made preferably from an aluminum alloy that is electrically grounded. One skilled in the art will appreciate that any suitable photoconductive belt may be used. Belt 10 moves in the direction of arrow 16 to advance successive portions of photoconductive surface 12 sequentially through the various processing stations disposed of throughout the path of movement thereof. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station A. At charging station A, a corona generating device, indicated generally by the reference numeral 26 charges photoconductive surface 12 to a relatively high, substantially uniform potential. High voltage power supply 28 is coupled to corona generating device 26 to charge photoconductive surface 12 of belt 10. After photoconductive surface 12 of belt 10 is charged, the charged portion thereof is advanced through exposure station B.

At exposure station B, an original document 30 is placed face down upon a transparent platen 32. Lamps 34 flash light rays onto original document 30. The light rays reflected from original document 30 are transmitted through lens 36 to form a light image thereof. Lens 36 focuses this light image onto the charged portion of photoconductive surface 12 to selectively dissipate the charge thereon. This records an electrostatic latent image on photoconductive surface 12 that corresponds to the informational areas contained within original document 30.

After the electrostatic latent image has been recorded on photoconductive surface 12, belt 10 advances the latent image to development station C. At development station C, a developer unit, indicated generally by the reference numeral 38, develops the latent image recorded on the photoconductive surface. Preferably, developer unit 38 includes donor roll 40 and electrode wires 42. Electrode wires 42 are electrically biased relative to donor roll 40 to detach toner therefrom so as to form a toner powder cloud in the gap between the donor roll and the photoconductive surface. The latent image attracts toner particles from the toner powder cloud forming a toner powder image thereon. Donor roll 40 is mounted, at least partially, in the chamber of developer housing 66. The chamber in developer housing 66 stores a supply of developer material. In one embodiment the developer material is a single component development material of toner particles, whereas in another the developer material includes at least toner and carrier.

With continued reference to FIG. 4, after the electrostatic latent image is developed, belt 10 advances the toner powder image to transfer station D. A copy sheet 70 is advanced to transfer station D by sheet feeding apparatus 72. Preferably, sheet feeding apparatus 72 includes a feed roll 74 contacting the uppermost sheet of stack 76 into chute 78. Chute 78 directs the advancing sheet of support material into contact with photoconductive surface 12 of belt 10 in a timed sequence so that the toner powder image developed thereon contacts the advancing sheet at transfer station D. Transfer station D includes a corona generating device 80 which sprays ions onto the back side of sheet 70. This attracts the toner powder image from photoconductive surface 12 to sheet 70. After transfer, sheet 70 continues to move in the direction of arrow 82 onto a conveyor (not shown) that advances sheet 70 to fusing station E.

Fusing station E includes a fuser assembly, indicated generally by the reference numeral 84, which permanently affixes the transferred powder image to sheet 70. Fuser assembly 84 includes a heated fuser roller 86 and a back-up roller 88. Sheet 70 passes between fuser roller 86 and back-up roller 88 with the toner powder image contacting fuser roller 86. In this manner, the toner powder image is permanently affixed to sheet 70. After fusing, sheet 70 advances through chute 92 to catch tray 94 for subsequent removal from the printing machine by the operator.

After the copy sheet is separated from photoconductive surface 12 of belt 10, the residual toner particles adhering to photoconductive surface 12 are removed therefrom at cleaning station F. Cleaning station F includes a rotatably mounted fibrous brush 96 in contact with photoconductive surface 12. The particles are cleaned from photoconductive surface 12 by the rotation of brush 96 in contact therewith. Subsequent to cleaning, a discharge lamp (not shown) floods photoconductive surface 12 with light to dissipate any residual electrostatic charge remaining thereon prior to the charging thereof for the next successive imaging cycle.

As successive electrostatic latent images are developed, the toner particles within the developer material are depleted. Toner is received from a toner dispenser indicated generally by reference numeral 106. The supply of toner is maintained in container 106 and is introduced to development sump (not shown) via auger (not shown) which is driven at a constant rate whenever motor (not shown) is energized by toner control system (not shown), as described in U.S. Pat. No. 5,081,491. As toner becomes depleted in toner dispenser 106 sensing device 120 of the present invention senses a low toner condition which is signaled to the operator to add more toner.

Figure 1:
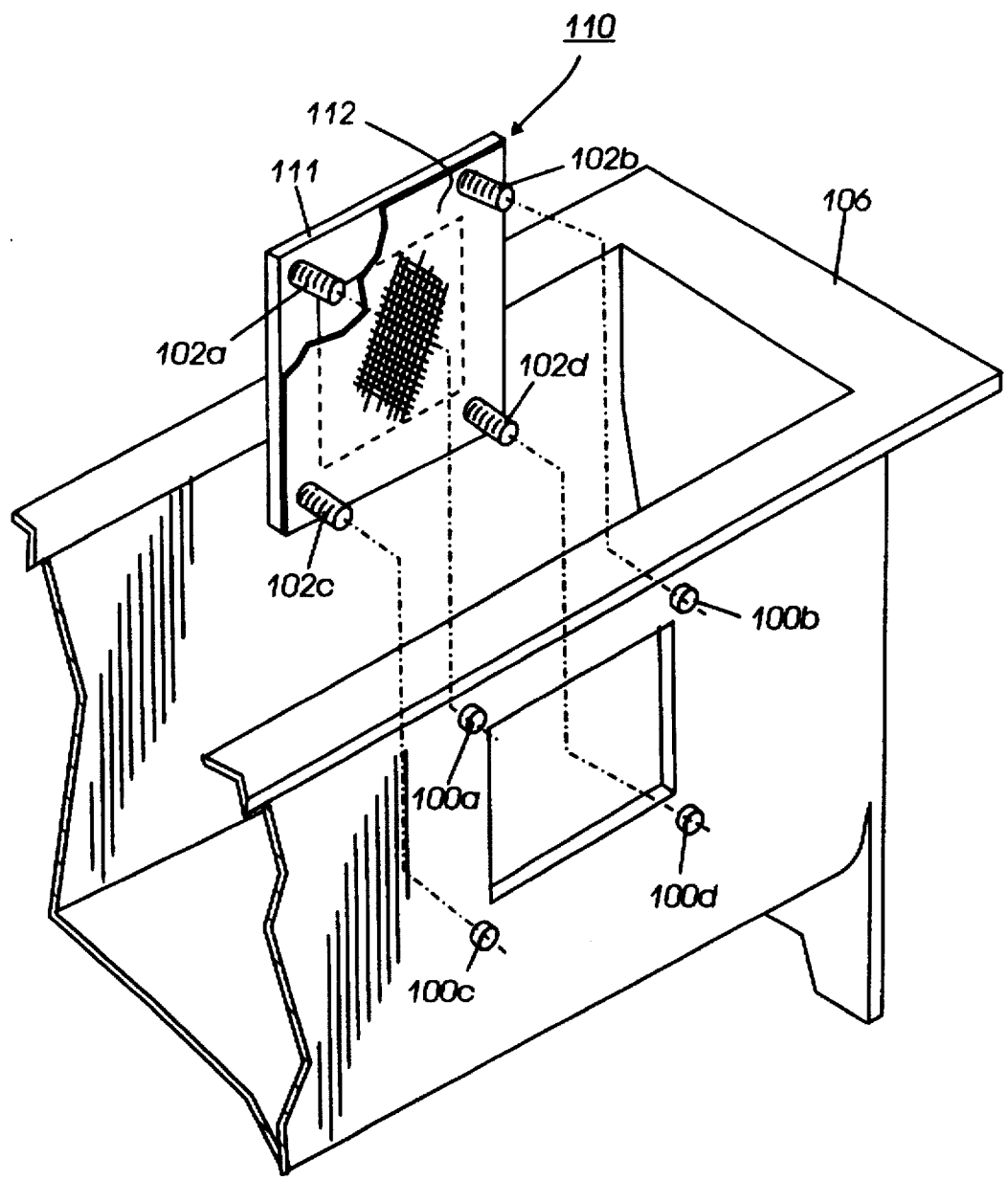
FIG. 1 is a schematic elevational view showing one embodiment of the replenisher hopper used in the FIG. 4 printing machine.
Figure 2:
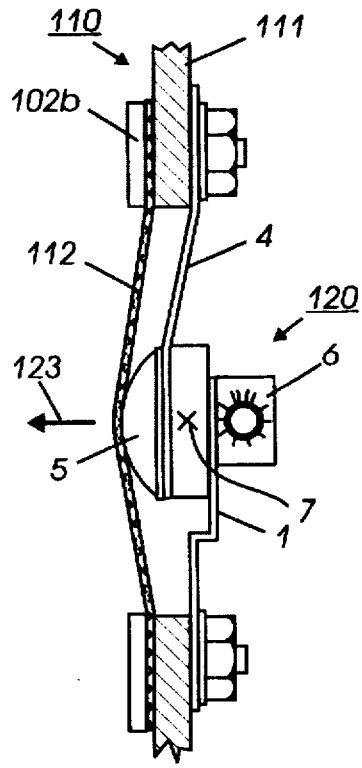
FIGS. 2 and 3 are a schematic elevational view sensor of the present invention.
Figure 3:
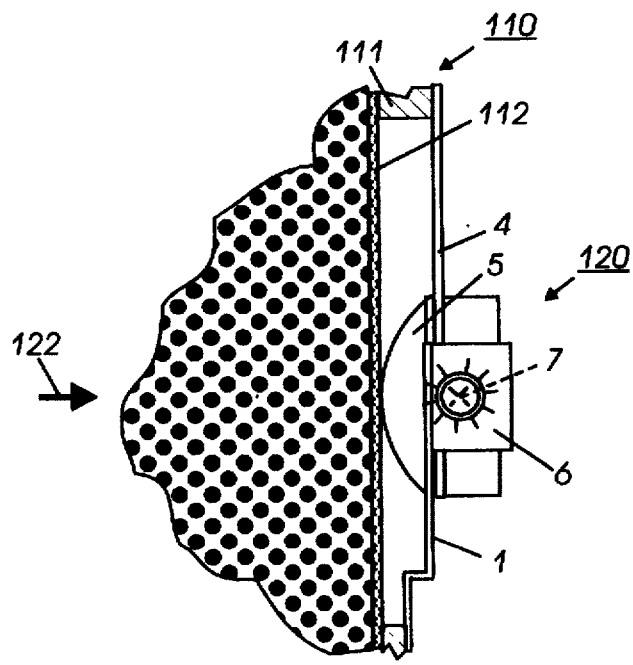

Referring to FIG. 1, a square "window" core opening is molded into the side of a replenisher hopper 106 with four clearance holes 100a, 100b, 100c and 100d equally spaced on the perimeter. A "picture frame" assembly 110 which consists of a mounting plate 111 with four threaded clinch studs 102a, 102b, 102c and 102d and a pre-stretched elastomer membrane 112, preferably made from Viton® is mounted on the inside of the cavity. Referring to FIGS. 2 and 3, sensor assembly 120 is then mounted externally to the cavity and fastened by four lock nuts. Sensor assembly 120 consist of leaf spring 4 having spoon shaped pad 5 attached thereto and optical sensor 6. Member 1 keeps optical sensor in a fixed position. The side load force designated by arrow 122 generated by the weight of the material internal in the hopper moves the indicating "flag" 7 on pad 5 in an outward direction generating a toner present signal to the sensor, as shown in FIG. 3. As successive electrostatic latent images are developed, the toner particles within the developer material are depleted in replenisher hopper 106, there is no longer the side load force and spring force designated by arrow 123 of leaf spring 4 causes spoon shaped pad 5 with indicating "flag" 7 thereon to move to a non sensing position generating a "no" toner present signal to the sensor. Whereupon a signal can be sent to an user interface to indicate to the operator to add more toner and/or shutting down the machine.

Advantageous features of the present invention is as follows: Optical sensor and sensing indicator "flag" is external to the replenisher material, full force of the material is needed to activate the indicator spring, residue or "ridging" condition alone would not generate enough force; the Viton membrane acts as a pre-load to the leaf spring and also a seal against replenisher material leakage; Viton elastomer is virtually unaffected by replenisher material with good memory characteristics, and reliability of the device is greater due to a more robust design, being mostly mechanical, it is not as subject to damage through shipping, handling, installation, or servicing.

It is, therefore, apparent that there has been provided in accordance with the present invention that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. In a system for dispensing toner particles from a toner hopper to a development system, a sensing system for detecting low toner condition within said toner hopper, said sensing system comprising:

a flexible wall assembly mounted within said hopper and in fluid communication with said toner particles within the toner hopper, said flexible wall assembly deforms when toner is present within said toner hopper; and a sensor assembly mounted exterior to the toner hopper and in contact with said flexible wall assembly, for sensing deformation of said flexible wall assembly.

2. The system according to claim 1, further comprising circuitry responsive to said sensor for generating a feed back signal indicative of a low toner condition within said toner hopper.

3. In a system for dispensing toner particles from a toner hopper to a development system, a sensing system for detecting low toner condition within said toner hopper, said sensing system comprising:

a flexible wall assembly mounted within said hopper and in fluid communication with said toner particles within the toner hopper, said flexible wall assembly being adapted to transmit an interior pressure generated by the toner within said toner hopper; and a sensor assembly mounted exterior to the toner hopper and in communication with said flexible wall assembly, for sensing said interior pressure, said sensor assembly comprises leaf springs having a pad in biased contact with said flexible wall assembly, and a sensor for detecting the movement of said pad.

* * * * *